United States Patent
Nishimura (12)

(10) Patent No.: US 6,567,595 B1
(45) Date of Patent: May 20, 2003

(54) OPTICAL FIBER LINE, OPTICAL TRANSMISSION LINE, METHOD OF MAKING OPTICAL CABLE, AND METHOD OF LAYING OPTICAL TRANSMISSION LINE

(75) Inventor: Masayuki Nishimura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 327 days.

(21) Appl. No.: 09/655,718

(22) Filed: Sep. 5, 2000

(30) Foreign Application Priority Data

Sep. 6, 1999 (JP) .......................................... 11-251580

(51) Int. Cl.$^7$ ................................................ G02B 6/44
(52) U.S. Cl. ......................................... 385/123; 385/24
(58) Field of Search ........................... 385/100, 24, 123

(56) References Cited

U.S. PATENT DOCUMENTS

| | | | | |
|---|---|---|---|---|
| 5,611,016 A | * | 3/1997 | Fangmann et al. | 385/100 |
| 5,764,841 A | | 6/1998 | Iwatsuki et al. | |
| 5,778,128 A | * | 7/1998 | Wildeman | 359/124 |
| 5,887,105 A | * | 3/1999 | Bhagavatula et al. | 385/123 |
| 6,307,985 B1 | * | 10/2001 | Murakami et al. | 385/24 |
| 6,374,027 B1 | * | 4/2002 | Onishi et al. | 359/161 |

FOREIGN PATENT DOCUMENTS

| | | | |
|---|---|---|---|
| EP | 0 532 388 | | 3/1993 |
| EP | 1 018 812 | | 7/2000 |
| GB | 2299473 A | * | 2/1996 |
| GB | 2 299 473 | | 10/1996 |
| WO | WO97/20403 | | 6/1997 |

OTHER PUBLICATIONS

"Design of Dispersion Managed Fiber and its FWM suppression Performance", K. Nakajima et al., OFC/IOOC'99 Technical Digest, ThG3 (1999), pp. 87–89.

"Chraplyvy A R et al.:" "8×10 GB/S Transmission Through 280 KM Of Dispersion–Managed Fiber" IEEE Photonics Technology Letters, IEEE Inc. New York, US, vol. 5, No. 10, Oct. 1, 1993, pp. 1233–1235.

"Peckham D W et al." "Reduced Dispersion Slope, Non–Zero Dispersion Fiber" Proceedings of the European Conference on Optical Communication, XX, XX, vol. 1, No. 1, 20 Sep. 20, 1998, pp. 139–140.

* cited by examiner

Primary Examiner—Hemang Sanghavi
Assistant Examiner—Scott A. Knauss
(74) Attorney, Agent, or Firm—McDermott, Will & Emery

(57) ABSTRACT

The present invention relates to an optical fiber line for transmitting a plurality of wavelengths of optical signals in a wavelength division multiplexing transmission system, an optical transmission line, a method of making an optical cable, and a method of laying an optical transmission line. The optical fiber line in accordance with the present invention comprises a plurality of positive dispersion optical fibers, having a positive chromatic dispersion in a signal wavelength band, selected from a positive dispersion optical fiber group whose cumulative dispersion conforms to a distribution with an average value of $D_A$ (>0) and a standard deviation of $\sigma_A$; and a plurality of negative dispersion optical fibers, having a negative chromatic dispersion in the signal wavelength band, selected from a negative dispersion optical fiber group whose cumulative dispersion conforms to a distribution with an average value of $D_B$ (<0) and a standard deviation of $\sigma_B$; the positive and negative dispersion optical fibers being alternately arranged and coupled in a longitudinal direction. This optical fiber line has a high transmission quality and can be constructed inexpensively.

14 Claims, 4 Drawing Sheets

CUMULATIVE DISPERSION VALUE [PS/nm]

TOTAL CUMULATIVE DISPERSION VALUE [PS/nm]

TOTAL CUMULATIVE DISPERSION VALUE [PS/nm]

OPTICAL FIBER LINE, OPTICAL TRANSMISSION LINE, METHOD OF MAKING OPTICAL CABLE, AND METHOD OF LAYING OPTICAL TRANSMISSION LINE

TITLE OF THE INVENTION

Optical Fiber Line, Optical Transmission Line, Method of Making Optical Cable, and Method of Laying Optical Transmission Line

BACKGROUND OF THE INVENTION

1. Field of the Invention

The present invention relates to an optical fiber line for transmitting a plurality of wavelengths of optical signals in a wavelength division multiplexing (WDM) transmission system, an optical transmission line, a method of making an optical cable, and a method of laying an optical transmission line.

2. Related Background Art

Along with demands for higher speed and larger capacity in optical communications, wavelength division multiplexing transmission techniques for transmitting a plurality of wavelengths of optical signals as being multiplexed have come into use.

For enhancing the transmission quality of such wavelength division multiplexing transmission, optical fiber lines to become a transmission medium are required to have the following characteristics. As the absolute value of chromatic dispersion in the optical fiber line in a signal wavelength band (e.g., 1.55-µm wavelength band) is greater, the pulse waveform of optical signals is more likely to deform, thereby deteriorating the transmission quality. Therefore, from such a viewpoint, it is desirable that the absolute value of chromatic dispersion in the optical fiber line be smaller. If the absolute value of chromatic dispersion in the signal wavelength band is smaller, on the other hand, then four-wave mixing, which is a kind of nonlinear optical phenomena, is more likely to occur, which causes cross talk and noise, thereby deteriorating the transmission quality. Therefore, from such a viewpoint, it is desirable that the absolute value of chromatic dispersion in the optical fiber line be greater.

For satisfying the two contradictory demands mentioned above, reference 1—K. Nakajima, et al., "Design of Dispersion Managed Fiber and its FWM suppression Performance," OFC'99 Technical Digest, ThG3 (1999)—, for example, discloses an optical fiber line whose chromatic dispersion is periodically changed so as to become positive and negative in the longitudinal direction, so that the absolute value of chromatic dispersion is sufficiently small in the line as a whole but locally greater. Described as a method of periodically changing the chromatic dispersion of optical fiber line so as to become negative and positive in reference 1 are methods in which core and cladding diameters are periodically changed, methods in which dopant concentrations are periodically changed, and the like.

SUMMARY OF THE INVENTION

The inventors have studied the conventional techniques mentioned above and, as a result, have found a problem as follows. Namely, the optical fiber lines in accordance with the above-mentioned conventional techniques necessitate a complicated manufacturing step in which the core or cladding diameter is periodically changed or a dopant concentration is periodically changed, which is also very hard to control. Along with the complexity in manufacturing steps and the difficulty in their control, the manufacturing cost rises as well. Therefore, in the case where an optical transmission line including a plurality of optical fiber lines is to be constructed in order to realize optical communications with a larger capacity, if the optical fiber lines in accordance with the above-mentioned conventional techniques are used therefor, then there will occur a problem that the manufacturing cost rises greatly.

Hence, it is an object of the present invention to overcome the above-mentioned problem, and provide an optical fiber line which has a higher transmission quality and can be constructed inexpensively, an optical transmission line, a method of making an optical cable, and a method of laying an optical transmission line.

The optical fiber line in accordance with the present invention comprises a plurality of positive dispersion optical fibers, having a positive chromatic dispersion in a signal wavelength band, selected from a positive dispersion optical fiber group whose cumulative dispersion conforms to a distribution with an average value of $D_A$ (>0) and a standard deviation of $\sigma_A$; and a plurality of negative dispersion optical fibers, having a negative chromatic dispersion in the signal wavelength band, selected from a negative dispersion optical fiber group whose cumulative dispersion conforms to a distribution with an average value of $D_B$ (<0) and a standard deviation of $\sigma_B$; the positive and negative dispersion optical fibers being alternately arranged and coupled in a longitudinal direction.

Without any complicated manufacturing steps and difficult control, positive and negative dispersion optical fibers are alternately coupled in this optical fiber line, whereby the absolute value of cumulative chromatic dispersion can be made sufficiently small in the optical fiber line as a whole, whereas chromatic dispersion can be kept from locally becoming zero. Also, since the positive and negative dispersion optical fibers are selected from the positive and negative dispersion optical fiber groups, respectively, the cumulative dispersion in the optical fiber line as a whole can fall within a predetermined range if the average values $D_A$ and $D_B$ and the standard deviations $\sigma_A$ and $\sigma_B$ are appropriately adjusted.

Preferably, each of the positive dispersion optical fibers has a chromatic dispersion of 2 ps/nm/km or greater, whereas each of the negative dispersion optical fibers has a chromatic dispersion of −2 ps/nm/km or smaller. In this manner, the absolute value of chromatic dispersion can be made locally greater.

Preferably, the average value of dispersion slope in the plurality of positive dispersion optical fibers and the average value of dispersion slope in the plurality of negative dispersion optical fibers have polarities different from each other. In this manner, a wavelength range in which the absolute value of chromatic dispersion becomes sufficiently small can be widened in the optical fiber line as a whole.

Preferably, each of the positive dispersion optical fibers and negative dispersion optical fibers has an effective area exceeding 50 $\mu m^2$. In this manner, nonlinear optical phenomena can be restrained from occurring.

Preferably, the absolute value of dispersion slope in each of the positive dispersion optical fibers and the absolute value of dispersion slope in each of the negative dispersion optical fibers are each smaller than 0.03 $ps/nm^2/km$. In this manner, a wavelength range in which the absolute value of chromatic dispersion becomes sufficiently small can be widened in the optical fiber line as a whole.

Preferably, the ratio of the mode field diameter of any of the negative dispersion optical fibers to the mode field diameter of any of the positive dispersion optical fibers is at least 0.8 but not exceeding 1.2. In this manner, loss can be lowered at junctions between the positive and negative dispersion optical fibers.

Preferably, each of the positive dispersion optical fibers and negative dispersion optical fibers has a length of 5 km or shorter. Since the interval between two repeaters connected to each other by an optical fiber line is usually about several tens of kilometers, an optical fiber line in which a plurality of positive dispersion optical fibers and a plurality of negative dispersion optical fibers are alternately coupled will be laid between the two repeaters if each of the positive and negative dispersion optical fibers has a length of 5 km or shorter. As a consequence, even when chromatic dispersion fluctuates more or less among the individual optical fibers, the absolute value of chromatic dispersion in the optical fiber line as a whole can be made sufficiently small in terms of statistics.

An optical transmission line will be constructed if a plurality of optical fiber lines, each mentioned above, are contained therein.

In this optical transmission line, a plurality of optical cables are arranged adjacent each other in a longitudinal direction; each optical cable containing a plurality of positive dispersion optical fibers, having a positive chromatic dispersion in a signal wavelength band, selected from a positive dispersion optical fiber group whose cumulative dispersion conforms to a distribution with an average value of $D_A$ (>0) and a standard deviation of $\sigma_A$ and a plurality of negative dispersion optical fibers, having a negative chromatic dispersion in the signal wavelength band, selected from a negative dispersion optical fiber group whose cumulative dispersion conforms to a distribution with an average value of $D_B$ (<0) and a standard deviation of $\sigma_B$; wherein, in first and second optical cables adjacent each other selected from the optical cables, the positive dispersion optical fibers contained in the first optical cable and the negative dispersion optical fibers contained in the second optical cable are coupled to each other, whereas the negative dispersion optical fibers contained in the first optical cable and the positive dispersion optical fibers contained in the second optical cable are coupled to each other.

Alternatively, the optical transmission line may be configured such that a positive dispersion optical cable and a negative dispersion optical cable are alternately arranged adjacent each other in a longitudinal direction; the positive dispersion optical cable containing a plurality of positive dispersion optical fibers, having a positive chromatic dispersion in a signal wavelength band, selected from a positive dispersion optical fiber group whose cumulative dispersion conforms to a distribution with an average value of $D_A$ (>0) and a standard deviation of $\sigma_A$; the negative dispersion optical cable containing a plurality of negative dispersion optical fibers, having a negative chromatic dispersion in the signal wavelength band, selected from a negative dispersion optical fiber group whose cumulative dispersion conforms to a distribution with an average value of $D_B$ (<0) and a standard deviation of $\sigma_B$; wherein the positive dispersion optical fibers contained in the positive dispersion optical cable and the negative dispersion optical fibers contained in the negative dispersion optical cable are coupled to each other.

Preferably, the optical cables provided in the optical transmission line are manufactured by the following method.

Namely, the method comprises the steps of selecting a plurality of positive dispersion optical fibers having a positive chromatic dispersion in a signal wavelength band from a positive dispersion optical fiber group whose cumulative dispersion conforms to a distribution with an average value of $D_A$ (>0) and a standard deviation of $\sigma_A$; selecting a plurality of negative dispersion optical fibers having a negative chromatic dispersion in the signal wavelength band from a negative dispersion optical fiber group whose cumulative dispersion conforms to a distribution with an average value of $D_B$ (<0) and a standard deviation of $\sigma_B$; and using the plurality of positive dispersion optical fibers and the plurality of negative dispersion optical fibers so as to make a plurality of optical cables each containing positive and negative dispersion optical fibers.

Alternatively, the method comprises the steps of selecting a plurality of positive dispersion optical fibers having a positive chromatic dispersion in a signal wavelength band from a positive dispersion optical fiber group whose cumulative dispersion conforms to a distribution with an average value of $D_A$ (>0) and a standard deviation of $\sigma_A$; selecting a plurality of negative dispersion optical fibers having a negative chromatic dispersion in the signal wavelength band from a negative dispersion optical fiber group whose cumulative dispersion conforms to a distribution with an average value of $D_B$ (<0) and a standard deviation of $\sigma_B$; and using the positive dispersion optical fiber so as to make a positive dispersion optical cable, and using the negative dispersion optical fiber so as to make a negative dispersion optical cable.

Preferably, the optical transmission line is laid by the following method.

Namely, the method comprises the steps of preparing a plurality of optical cables; each optical cable containing a plurality of positive dispersion optical fibers, having a positive chromatic dispersion in a signal wavelength band, selected from a positive dispersion optical fiber group whose cumulative dispersion conforms to a distribution with an average value of $D_A$ (>0) and a standard deviation of $\sigma_A$ and a plurality of negative dispersion optical fibers, having a negative chromatic dispersion in the signal wavelength band, selected from a negative dispersion optical fiber group whose cumulative dispersion conforms to a distribution with an average value of $D_B$ (<0) and a standard deviation of $\sigma_B$; and arranging the optical cables adjacent each other in a longitudinal direction such that, in first and second optical cables adjacent each other in the optical cables, the positive dispersion optical fibers contained in the first optical cable and the negative dispersion optical fibers contained in the second optical cable are coupled to each other, whereas the negative dispersion optical fibers contained in the first optical cable and the positive dispersion optical fibers contained in the second optical cable are coupled to each other.

Alternatively, the method comprises the steps of preparing a positive dispersion optical cable containing a plurality of positive dispersion optical fibers, having a positive chromatic dispersion in a signal wavelength band, selected from a positive dispersion optical fiber group whose cumulative dispersion conforms to a distribution with an average value of $D_A$ (>0) and a standard deviation of $\sigma_A$; preparing a negative dispersion optical cable containing a plurality of negative dispersion optical fibers, having a negative chromatic dispersion in the signal wavelength band, selected from a negative dispersion optical fiber group whose cumulative dispersion conforms to a distribution with an average value of $D_B$ (<0) and a standard deviation of $\sigma_B$; and alternately arranging the positive and negative dispersion optical cables in a longitudinal direction such that the positive dispersion optical fibers contained in the positive dispersion optical cable and the negative dispersion optical fibers contained in the negative dispersion optical cable are coupled to each other.

The present invention will become more fully understood from the detailed description given hereinbelow and the accompanying drawings. They are given by way of illustration only, and thus should not be considered limitative of the present invention.

DESCRIPTION OF THE PREFERRED EMBODIMENT

Figure 1:
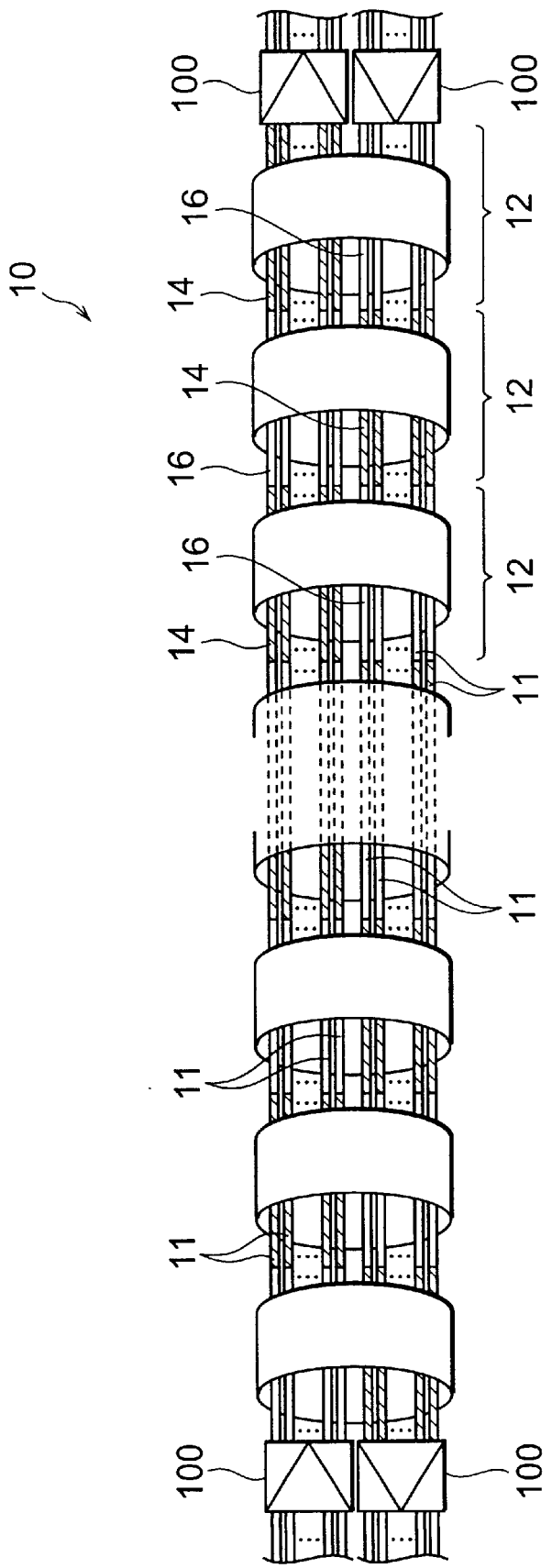
FIG. 1 is a schematic view showing a first embodiment of the optical transmission line containing a plurality of optical fiber lines in accordance with the present invention.

In the following, preferred embodiments of the optical fiber line, optical transmission line, method of making an optical cable, and method of laying an optical transmission line in accordance with the present invention will be explained with reference to the accompanying drawings. Here, the same reference numerals denote the same elements throughout the drawings, and a detailed description thereof will be omitted.

To begin with, a first embodiment of the optical transmission line containing a plurality of optical fiber lines in accordance with the present invention will be explained. FIG. 1 is a view showing the configuration of the optical transmission line 10 in accordance with this embodiment.

As shown in FIG. 1, the optical transmission line 10 is constituted by a plurality of optical cables 12 coupled to one another and is laid between optical repeaters 100.

Each of the plurality of optical cables 12 contains a plurality of positive dispersion optical fibers 14 having a positive chromatic dispersion in a 1.55-$\mu$m wavelength band which is a signal wavelength band and a plurality of negative dispersion optical fibers 16 having a negative chromatic dispersion in the same 1.55-$\mu$m signal wavelength band. The number of positive dispersion optical fibers 14 and the number of negative dispersion optical fibers 16 are identical to each other in the optical cable 12.

Each of the positive dispersion optical fibers 14 is an optical fiber selected from a positive dispersion optical fiber group whose cumulative dispersion at a predetermined wavelength (e.g., 1550 nm) conforms to a distribution with an average value of $D_A$ (>0) and a standard deviation of $\sigma_A$. Each of the negative dispersion optical fibers 16 is an optical fiber selected from a positive dispersion optical fiber group whose cumulative dispersion at a predetermined wavelength (e.g., 1550 nm) conforms to a distribution with an average value of $D_B$ (<0) and a standard deviation of $\sigma_B$. The positive and negative dispersion optical fiber groups will be explained later.

Preferably, the positive dispersion optical fiber 14 has a chromatic dispersion of 2 ps/nm/km or greater in the 1.55-$\mu$m wavelength band, whereas the negative dispersion optical fiber 16 has a chromatic dispersion of −2 ps/nm/km or smaller in the 1.55-$\mu$m wavelength band. Preferably, the average value of chromatic dispersion in the plurality of positive dispersion optical fibers 14 in the 1.55-$\mu$m wavelength band and the average value of chromatic dispersion in the plurality of negative dispersion optical fibers 16 in the 1.55-$\mu$m wavelength band have absolute values approximately identical to each other.

Preferably, the average value of dispersion slope (differentiation of chromatic dispersion with respect to wavelength) in the plurality of positive dispersion optical fibers 14 in the 1.55-$\mu$m wavelength band and the average value of dispersion slope in the plurality of negative dispersion optical fibers 16 in the 1.55-$\mu$m wavelength band have polarities different from each other.

Preferably, each of the positive dispersion optical fiber 14 and negative dispersion optical fiber 16 has an effective area exceeding 50 $\mu m^2$ and an absolute value of dispersion slope smaller than 0.03 ps/nm$^2$/km. Preferably, the ratio of the mode field diameter of the negative dispersion optical fiber 16 to the mode field diameter of the positive dispersion optical fiber 14 is at least 0.8 but not exceeding 1.2.

By way of example, the positive dispersion optical fiber 14 and negative dispersion optical fiber 16 having the characteristics shown in Table 1 are preferably used.

TABLE 1

| CHARACTERISTIC | POSITIVE DISPERSION OPTICAL FIBER 14 | NEGATIVE DISPERSION OPTICAL FIBER 16 |
|---|---|---|
| FIBER TYPE | DISPERSION-FLATTENED FIBER | DISPERSION-FLATTENED FIBER |
| EFFECTIVE AREA (m$^2$) | 50 TO 55 | 50 TO 55 |
| CHROMATIC DISPERSION (ps/nm/km) | +2 TO +5 | −2 TO −5 |
| AVERAGE VALUE OF CHROMATIC DISPERSION (ps/nm/km) | +3.5 | −3.7 |

TABLE 1-continued

| CHARACTERISTIC | POSITIVE DISPERSION OPTICAL FIBER 14 | NEGATIVE DISPERSION OPTICAL FIBER 16 |
|---|---|---|
| DISPERSION SLOPE (ps/nm²/km) | +0.01 TO +0.03 | −0.01 TO +0.01 |
| AVERAGE VALUE OF DISPERSION SLOPE (ps/nm²/km) | +0.015 | −0.05 |

Each of the positive dispersion optical fiber 14 and negative dispersion optical fiber 16 has substantially the same length, which is 5 km or shorter.

The plurality of optical cables 12 are arranged adjacent each other in the longitudinal direction thereof, such that, in first and second optical cables adjacent each other selected from the plurality of optical cables 12, the positive dispersion optical fibers 14 contained in the first optical cable and the negative dispersion optical fibers 16 contained in the second optical cable are coupled to each other, whereas the negative dispersion optical fibers 16 contained in the first optical cable and the positive dispersion optical fibers 14 contained in the second optical cable are coupled to each other. As a result, the optical transmission line 10 contains a plurality of optical fiber lines 11 each comprising the positive dispersion optical fiber 14 and negative dispersion optical fiber 16 coupled to each other.

A method of making the optical cables 12 provided in the optical transmission line 10 in accordance with this embodiment will now be explained.

Figure 2:
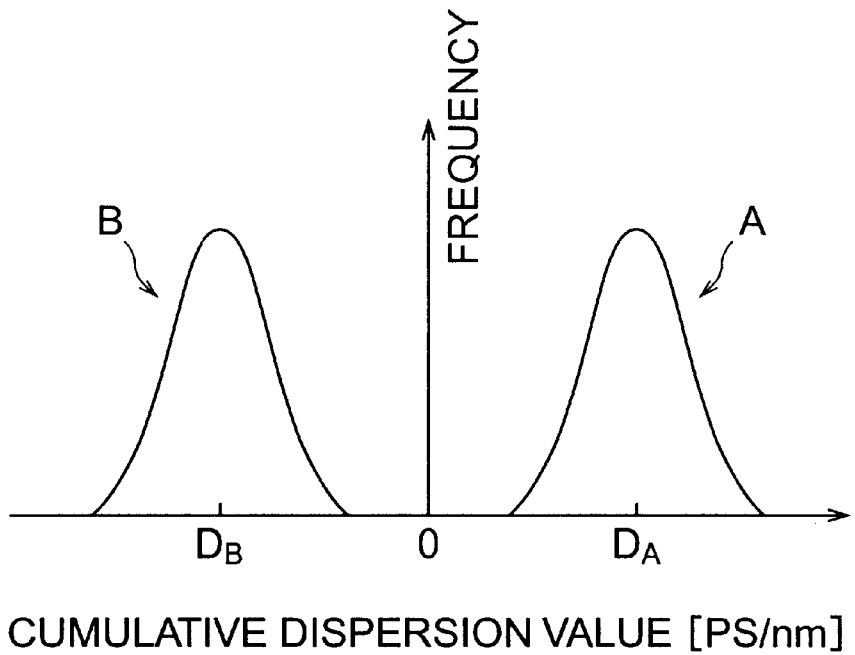
FIG. 2 is a graph for explaining a positive dispersion optical fiber group and a negative dispersion optical fiber group.

First, for making the optical cables 12, as shown in FIG. 2, a positive dispersion optical fiber group A including a plurality of optical fibers 14 having a positive chromatic dispersion in the 1.55-μm wavelength band, which is the signal wavelength band, and a negative dispersion optical fiber group B including a plurality of optical fibers 16 having a positive chromatic dispersion in the 1.55-μm wavelength band, which is the signal wavelength band, are prepared.

In the positive dispersion optical fiber group A, the cumulative dispersion at a predetermined wavelength (e.g., 1550 nm) conforms to a Gaussian distribution having an average value of $D_A$ (>0) and a standard deviation of $\sigma_A$. In the negative dispersion optical fiber group B, the cumulative dispersion at a predetermined wavelength (e.g., 1550 nm) conforms to a Gaussian distribution having an average value of $D_B$ (<0) and a standard deviation of $\sigma_B$.

Preferably, the absolute value of the sum of average values $D_A$ and $D_B$ is not greater than 20% of the average value $D_A$, whereas the absolute value of the difference between standard deviations $\sigma_A$ and $\sigma_B$ is not greater than 20% of the standard deviation $\sigma_A$.

Preferably, the average value $D_A$ is within the range of 5 to 50 ps/nm, whereas the standard deviation $\sigma_A$ is within the range of 0 to 5 ps/nm. Preferably, the average value $D_B$ is within the range of −50 to −5 ps/nm, whereas the standard deviation $\sigma_B$ is within the range of 0 to 5 ps/nm.

Ideally, it is preferred that the average values $D_A$ and $D_B$ have the same absolute value, while the standard deviations $\sigma_A$ and $\sigma_B$ are identical to each other.

A plurality of positive dispersion optical fibers 14 are selected from the positive dispersion optical fiber group A, a plurality of negative dispersion optical fibers 16 are selected from the negative dispersion optical fiber group B, and thus selected positive dispersion optical fibers 14 and negative dispersion optical fibers 16 are bundled, so as to produce a plurality of optical cables 12.

A method of laying the optical transmission line 10 in accordance with this embodiment will now be explained. First, for laying the optical transmission line 10 in accordance with this embodiment, a plurality of optical cables 12 made by the above-mentioned method of making optical cables are prepared.

Then, the plurality of optical cables 12 are arranged adjacent each other in the longitudinal direction such that, in first and second optical cables adjacent each other in the plurality of optical cables, the positive dispersion optical fibers 14 contained in the first optical cable and the negative dispersion optical fibers 16 contained in the second optical cable are coupled to each other, whereas the negative dispersion optical fibers 16 contained in the first optical cable and the positive dispersion optical fibers 14 contained in the second optical cable are coupled to each other.

Figure 3:
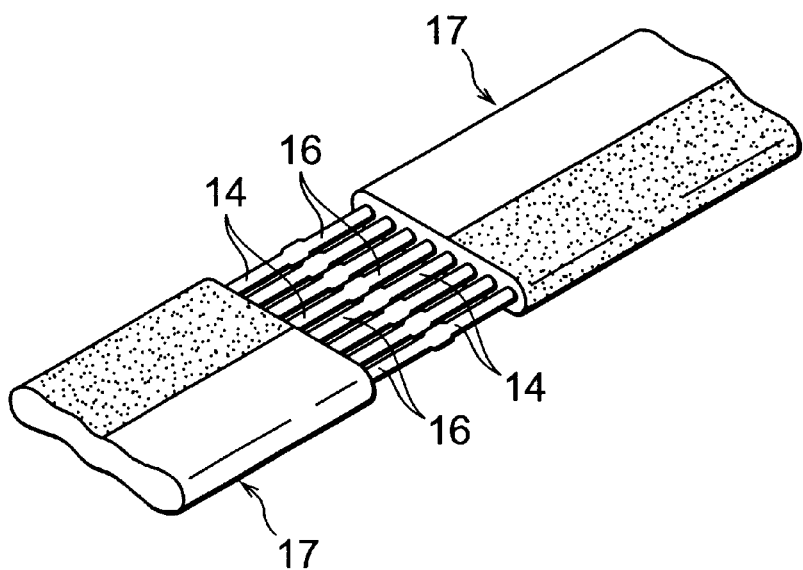
FIG. 3 is a view showing an example of coupling in which positive dispersion optical fibers and negative dispersion optical fibers contained in adjacent optical cables are coupled to each other.

Here, for example, as shown in FIG. 3, the positive dispersion optical fibers 14 and negative dispersion optical fibers 16 contained in the optical cable 12 are bundled like an array so as to form a ribbon 17, and a mark is provided on the positive dispersion optical fiber 14 side or negative dispersion optical fiber 16 side of the ribbon 17, whereby these fibers can easily be coupled to their corresponding positive dispersion optical fibers 14 and negative dispersion optical fibers 16 contained in the adjacent optical cable 12.

The total cumulative dispersion in each optical fiber line 11 contained in the optical transmission line 10 in accordance with this embodiment will now be studied.

For the sake of simplicity, the absolute value $D_A$ of cumulative dispersion in the positive dispersion optical fiber group A is assumed to be $D_0$, and the standard deviation $\sigma_A$ be $\sigma_0$. Let m be the number of optical cables 12, and $D_i$ [ps/nm] be the cumulative dispersion value of optical fibers contained in the i-th optical cable in the m pieces of optical cables 12. Then, the total cumulative dispersion value $D_{total}$ of each optical fiber line 11 contained in the optical transmission line 10 is expressed as:

$$D_{total} = \sum_{i=1}^{m} D_i$$

Figure 4:
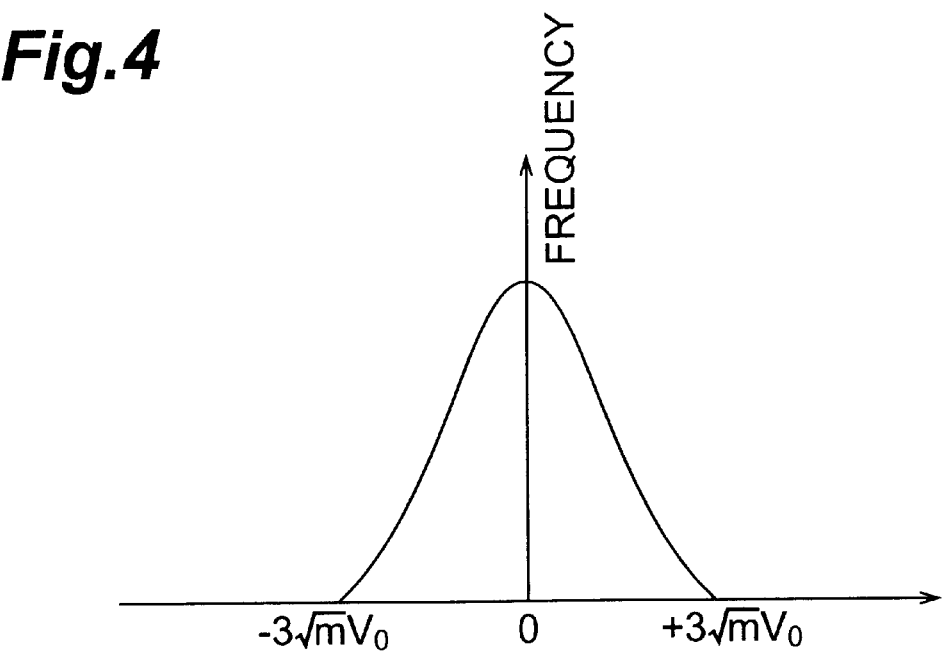
FIG. 4 is a graph showing the distribution of dispersion accumulated in an optical fiber line as a whole in the case where an even number of optical cables are provided.

Here, in the case where the number m of optical cables 12 is 2n (where n is a natural number), $D_{total}$ is distributed due to its statistical characteristic so as to yield an average value $D_{ave}$ of 0 [ps/nm] and a standard deviation $\sigma_{ave}$ of $m^{1/2} \cdot \sigma_0$ [ps/nm] as shown in FIG. 4.

Figure 5:
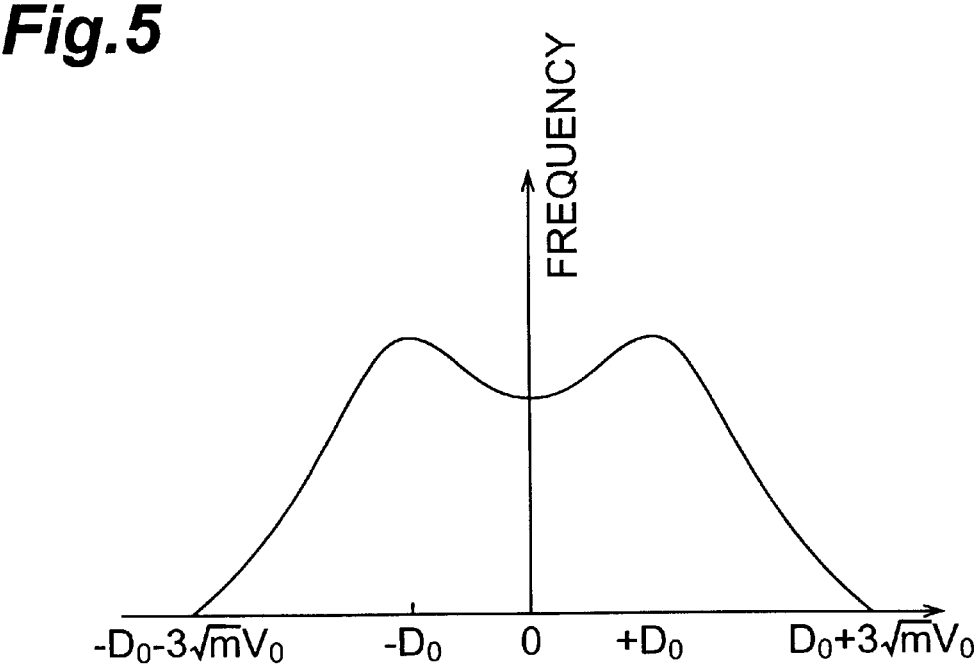
FIG. 5 is a graph showing the distribution of dispersion accumulated in an optical fiber line as a whole in the case where an odd number of optical cables are provided.

In the case where the number m of optical cables 12 is 2n+1 (where n is a natural number), $D_{total}$ is distributed due to its statistical characteristic so as to yield an average value $D_{ave}$ of $+D_0$ or $-D_0$ [ps/nm] depending on whether the positive dispersion optical fibers 14 or negative dispersion optical fibers 16 have a greater number, and a standard deviation $\sigma_{ave}$ of $m^{1/2} \cdot \sigma_0$ [ps/nm] as shown in FIG. 5.

More specifically, it is assumed that, at a wavelength of 1550 nm, the positive dispersion optical fiber group A has an average value of dispersion of 3.5 [ps/nm/km] and a standard deviation of 0.5 [ps/nm/km]. On the other hand, it is assumed that, at a wavelength of 1550 nm, the negative dispersion optical fiber group B has an average value $-D_0$ of dispersion of $-3.5$ [ps/nm/km] and a standard deviation of 0.5 [ps/nm/km]. Also, it is assumed that the optical fibers contained in the positive dispersion optical fiber group A and negative dispersion optical fiber group B each have a length of 4 [km]. Then the average value $D_0$ of cumulative dispersion of the positive dispersion optical fiber group A is 14 [ps/nm] and a standard deviation $\sigma_0$ is 2 [ps/nm] at a wavelength of 1550 nm. On the other hand, the average value $-D_0$ of cumulative dispersion of the negative dispersion optical fiber group B is $-14$ [ps/nm] and a standard deviation $\sigma_0$ is 2 [ps/nm] at a wavelength of 1550 nm.

In the case where the number m of optical cables 12 is 20, which is an even number, the length of each optical fiber line 11 becomes 80 [km]. Then, the total cumulative dispersion value $D_{total}$ of each optical fiber line 11 is distributed so as to yield an average value $D_{ave}$ of 0 [ps/nm] and a standard deviation $\sigma_{ave}$ of 8.9 [ps/nm/km].

If the maximum fluctuation of total cumulative dispersion value $D_{total}$ in each optical fiber line 11 is estimated by average value $D_{ave}$ ±(standard deviation $\sigma_{ave}$ ×3), then the total cumulative dispersion value $D_{total}$ of each optical fiber line 11 is presumed to fall within the range of ±27 [ps/nm] (±0.34 [ps/nm/km]).

In the case where the number m of optical cables 12 is 21, which is an odd number, the length of optical fiber line 11 becomes 84 [km]. Then, the total cumulative dispersion value $D_{total}$ of each optical fiber line is distributed so as to yield an average value $D_{ave}$ of +14 or −14 [ps/nm] and a standard deviation $\sigma_{ave}$ of 9.2 [ps/nm/km].

If the maximum fluctuation of total cumulative dispersion value $D_{total}$ in each optical fiber line 11 is estimated by average value $D_{ave}$ ±(standard deviation $\sigma_{ave}$×3), then the total cumulative dispersion value $D_{total}$ of each optical fiber line 11 is presumed to fall within the range of ±42 [ps/nm] (±0.5 [ps/nm/km]).

Here, though the length of each optical fiber becomes 2 [km] if the length of optical fiber line 11 is 82 [km], for example, the total cumulative dispersion value $D_{total}$ would not exceed the above-mentioned range of ±42 [ps/nm].

Let the optical transmission line 10 containing a plurality of optical fiber lines 11, each yielding a total length of 84 [km] and a total cumulative dispersion value $D_{total}$ of ±42 [ps/nm], be one span of optical amplification and relay. If six spans (504 km) of optical transmission line is constructed, for example, then its total cumulative dispersion will be ±252 [ps/nm] at the worst. Its absolute value is sufficiently smaller than the permissible cumulative dispersion value of 1000 [ps/nm] required for transmission at a transmission speed of 10 Gb/s.

Though the case where the dispersion per unit length of each optical fiber fluctuates while individual optical fibers are assumed to have a constant length is considered for the sake of simplicity when studying the total cumulative dispersion of each optical fiber line 11 contained in the optical transmission line 10, the total cumulative dispersion of each optical fiber line 11 may be studied while additionally taking account of fluctuations in the length of optical fibers.

Operations and effects of the optical transmission line in accordance with this embodiment will now be explained.

Since a plurality of optical cables 12 each containing a plurality of positive dispersion optical fibers 14 and a plurality of negative dispersion optical fibers 16 are arranged adjacent each other in the longitudinal direction thereof, such that the positive dispersion optical fibers 14 and negative dispersion optical fibers 16 are coupled to each other, the optical transmission line 10 in accordance with this embodiment contains a plurality of optical fiber lines 11 in which the positive dispersion optical fibers 14 and the negative dispersion optical fibers 16 are alternately coupled. Therefore, without any complicated manufacturing steps and difficult control, the optical transmission line 10 attains a configuration containing a plurality of optical fiber lines 11 which have a sufficiently small absolute value of dispersion and keep the absolute value of chromatic dispersion from locally becoming zero. As a result, pulse waveforms are prevented from deforming, and four-wave mixing is restrained from occurring, whereby the transmission quality of optical transmission line 10 can be enhanced, and the optical transmission line 10 can be constructed inexpensively.

Also, each of the positive dispersion optical fibers 14 is an optical fiber selected from the positive dispersion optical fiber group A whose cumulative dispersion conforms to a Gaussian distribution having an average value of $D_A$ (>0) and a standard deviation of $\sigma_A$, whereas each of the negative dispersion optical fibers 16 is an optical fiber selected from the negative dispersion optical fiber group B whose cumulative dispersion conforms to a Gaussian distribution having an average value of $D_B$ (<0) and a standard deviation of $\sigma_B$. Therefore, if the average values $D_A$ and $D_B$ and standard deviations $\sigma_A$ and $\sigma_B$ are adjusted appropriately, then the cumulative dispersion in the optical fiber line 11 as a whole can fall within a predetermined range, whereby the transmission quality of optical transmission line 10 can be improved, and it is possible to construct the optical transmission line 10 suitable for large-capacity optical communications using a high bit rate and a wavelength division multiplexing system.

If the positive dispersion optical fiber 14 has a chromatic dispersion of 2 ps/nm/km or greater in the 1.55-$\mu$m wavelength band while the negative dispersion optical fiber 16 has a chromatic dispersion of −2 ps/nm/km or smaller in the 1.55-$\mu$m wavelength band in the optical transmission line 10 in accordance with this embodiment, then the absolute value of chromatic dispersion can be made locally greater. As a result, the effect of suppressing four-wave mixing enhances, and the transmission quality further improves.

If the average value of chromatic dispersion in the plurality of positive dispersion optical fibers 14 and the average value of chromatic dispersion in the plurality of negative dispersion optical fibers 16 have absolute values approximately identical to each other, then chromatic dispersion can become substantially zero in the whole optical fiber line 11 constituted by the positive dispersion optical fibers 14 and negative dispersion optical fibers 16 alternately coupled to each other. As a result, optical signal hardly deforms its pulse waveform, whereby the transmission quality further improves.

If the average value of dispersion slope in the plurality of positive dispersion optical fibers 14 and the average value of dispersion slope in the plurality of negative dispersion optical fibers 16 have polarities different from each other in the optical transmission line in accordance with this embodiment, a wavelength range in which the absolute value of chromatic dispersion becomes sufficiently small can be widened in the whole optical fiber line 11 constituted by the positive dispersion optical fibers 14 and negative dispersion optical fibers 16 alternately coupled to each other. As a result, the number of wavelengths subjected to wavelength division multiplexing can be enhanced, whereby a larger capacity is realized in optical communications.

If the positive dispersion optical fiber 14 and negative dispersion optical fiber 16 each have an effective area exceeding 50 $\mu m^2$ in the optical transmission line 10 in accordance with this embodiment, nonlinear optical phenomena can be restrained from occurring.

If the absolute value of dispersion slope in the positive dispersion optical fiber 14 and negative dispersion optical fiber 16 is smaller than 0.03 ps/nm²/km in the optical transmission line 10 in accordance with this embodiment, then a wavelength range in which the absolute value of chromatic dispersion becomes sufficiently small can be widened in the optical fiber line 11 as a whole.

If the ratio of the mode field diameter of the negative dispersion optical fiber 16 to the mode field diameter of the positive dispersion optical fiber 14 is at least 0.8 but not exceeding 1.2 in the optical transmission line 10 in accordance with this embodiment, loss can be lowered at the junction between the positive dispersion optical fiber 14 and negative dispersion optical fiber 16.

If the positive dispersion optical fiber 14 and negative dispersion optical fiber 16 each have a length of 5 km or shorter, and the optical fiber line 11 comprising a number of positive dispersion optical fibers 14 and negative dispersion optical fibers 16 alternately coupled to each other is constructed in the optical transmission line 10 in accordance with this embodiment, then the absolute value of chromatic dispersion in the optical fiber line 11 as a whole can sufficiently be made smaller in terms of statistics even when chromatic dispersion fluctuates more or less among the individual optical fibers.

Figure 6:
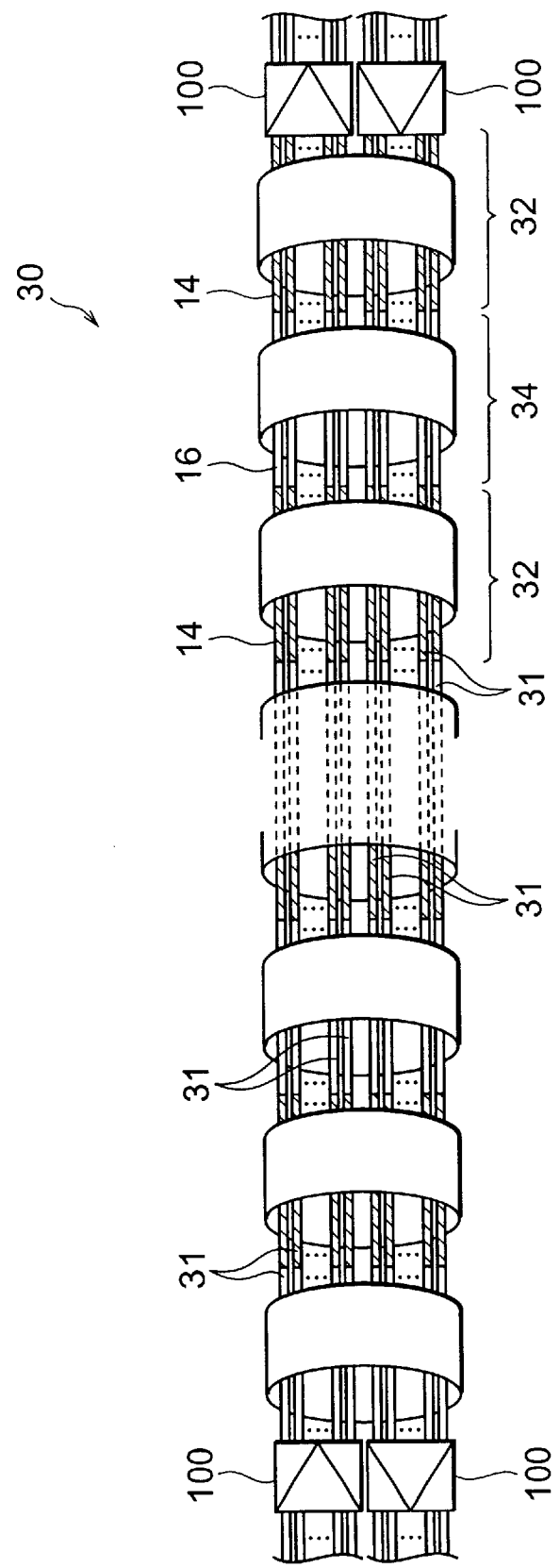
FIG. 6 is a schematic view showing a second embodiment of the optical transmission line containing a plurality of optical fiber lines in accordance with the present invention.

A second embodiment of the optical transmission line including a plurality of optical fiber lines in accordance with the present invention will now be explained. FIG. 6 is a view showing the configuration of the optical transmission line 30 in accordance with this embodiment. The optical transmission line 30 in accordance with this embodiment differs from the optical transmission line 10 in accordance with the first embodiment in the following points. In the optical transmission line 10 in accordance with the first embodiment, a plurality of optical cables 12 each containing a plurality of positive dispersion optical fibers 14 and a plurality of negative dispersion optical fibers 16 are arranged adjacent each other in its longitudinal direction such that the positive dispersion optical fibers 14 and negative dispersion optical fibers 16 are coupled to each other. In the optical transmission line 30 in accordance with the second embodiment, by contrast, as shown in FIG. 6, a positive dispersion optical cable 32 containing a plurality of positive dispersion optical fibers 14 and a negative dispersion optical cable 34 containing a plurality of negative dispersion optical fibers 16 are arranged adjacent each other in the longitudinal direction such that the positive dispersion optical fibers 14 and negative dispersion optical fibers 16 are coupled to each other.

Here, the number of positive dispersion optical fibers 14 contained in the positive dispersion optical cable 32 and the number of the negative dispersion optical fibers 16 contained in the negative dispersion optical cable 34 are identical to each other. Also, each of the positive dispersion optical fibers 14 and negative dispersion optical fibers 16 has substantially the same length, which is 5 km or shorter.

A method of making the positive dispersion optical cable 32 and negative dispersion optical cable 34 provided in the optical transmission line 30 in accordance with the second embodiment will now be explained.

For making the positive dispersion optical cable 32 and negative dispersion optical cable 34 in accordance with the second embodiment, as in the first embodiment, a positive dispersion optical fiber group A containing a plurality of positive dispersion optical fibers 14 having a positive chromatic dispersion in the 1.55-$\mu$m wavelength band, which is a signal wavelength band, and a negative dispersion optical fiber group B containing a plurality of negative dispersion optical fibers 16 having a negative chromatic dispersion in the 1.55-$\mu$m wavelength band, which is a signal wavelength band, are prepared as shown in FIG. 2.

In the positive dispersion optical fiber group A, the cumulative dispersion at a predetermined wavelength (e.g., 1550 nm) conforms to a Gaussian distribution having an average value of $D_A$ (>0) and a standard deviation of $\sigma_A$. In the negative dispersion optical fiber group B, the cumulative dispersion at a predetermined wavelength (e.g., 1550 nm) conforms to a Gaussian distribution having an average value of $D_B$ (<0) and a standard deviation of $\sigma_B$.

A plurality of positive dispersion optical fibers 14 are selected from the positive dispersion optical fiber group A, so as to produce the positive dispersion optical cable 32, whereas a plurality of negative dispersion optical fibers 16 are selected from the negative dispersion optical fiber group B, so as to produce the negative dispersion optical cable 34.

A method of laying the optical transmission line 30 in accordance with this embodiment will now be explained. For laying the optical transmission line 30 in accordance with this embodiment, the positive dispersion optical cable 32 and negative dispersion optical cable 34 made by the above-mentioned manufacturing method are alternately arranged adjacent each other in the longitudinal direction such that the positive dispersion optical fibers 14 contained in the positive dispersion optical cable 32 and the negative dispersion optical fibers 16 contained in the negative dispersion optical cable 34 are coupled to each other.

Since the positive dispersion optical cable 32 containing a plurality of positive dispersion optical fibers 14 and the negative dispersion optical cable 34 containing a plurality of negative dispersion optical fibers 16 are arranged adjacent each other in the longitudinal direction such that the positive dispersion optical fibers 14 and negative dispersion optical fibers 16 are coupled to each other, the optical transmission line 30 in accordance with this embodiment contains a plurality of optical fiber lines 31 in which the positive dispersion optical fibers 14 and the negative dispersion optical fibers 16 are alternately coupled. Therefore, without any complicated manufacturing steps and difficult control, it attains a configuration containing a plurality of optical fiber lines 31 which have a sufficiently small absolute value of dispersion and keep the absolute value of chromatic dispersion from locally becoming zero. As a result, pulse waveforms are prevented from deforming, and four-wave mixing is restrained from occurring, whereby the transmission quality of optical transmission line 30 can be enhanced, and the optical transmission line 30 can be constructed inexpensively.

Also, each of the positive dispersion optical fibers 14 is an optical fiber selected from the positive dispersion optical fiber group A whose cumulative dispersion conforms to a Gaussian distribution having an average value of $D_A$ (>0) and a standard deviation of $\sigma_A$, whereas each of the negative dispersion optical fibers 16 is an optical fiber selected from the negative dispersion optical fiber group B whose cumulative dispersion conforms to a Gaussian distribution having an average value of $D_B$ (<0) and a standard deviation of $\sigma_B$. Therefore, if the average values $D_A$ and $D_B$ and standard deviations $\sigma_A$ and $\sigma_B$ are adjusted appropriately, then the cumulative dispersion in the optical fiber line 31 as a whole can fall within a predetermined range, whereby the transmission quality of optical transmission line 30 can be improved, and it is possible to construct the optical transmission line 30 suitable for large-capacity optical communications using a high bit rate and a wavelength division multiplexing system.

Further, since the optical transmission line 30 in accordance with this embodiment is constructed by use of a plurality of positive dispersion optical cables 32 each containing a plurality of positive dispersion optical fibers 14 and a plurality of negative dispersion optical cables 34 each containing a plurality of negative dispersion optical fibers 16, the positive dispersion optical fibers 14 and negative dispersion optical fibers 16 will naturally be coupled to each other if only the positive dispersion optical cables 32 and negative dispersion optical cables 34 are alternately arranged adjacent each other, and the respective optical fibers contained therein are coupled to each other. As a consequence, coupling errors (e.g., errors such as the coupling of positive dispersion optical fibers 14 to each other) can be prevented from occurring, whereby reliability and stability improve in the work of laying.

Since positive and negative dispersion optical fibers are alternately coupled, the optical fiber line of the present invention, without any complicated manufacturing steps and difficult control, can attain a sufficiently small absolute value of cumulative chromatic dispersion in the optical fiber line as a whole and can keep the absolute value of chromatic dispersion from locally becoming zero. As a result, pulse waveforms are prevented from deforming, and four-wave mixing is restrained from occurring, whereby the transmission quality of optical fiber line can be enhanced, and the optical fiber line can be constructed inexpensively.

Also, since each of the positive dispersion optical fibers is an optical fiber selected from a positive dispersion optical fiber group whose cumulative dispersion conforms to a distribution with an average value of $D_A$ (>0) and a standard deviation of $\sigma_A$, whereas each of the negative dispersion optical fibers is an optical fiber selected from a negative dispersion optical fiber group whose cumulative dispersion conforms to a distribution with an average value of $D_B$ (<0) and a standard deviation of $\sigma_B$, the cumulative dispersion in the optical fiber line as a whole can fall within a predetermined range if the average values $D_A$ and $D_B$ and the standard deviations $\sigma_A$ and $\sigma_B$ are appropriately adjusted, whereby the transmission quality of optical fiber line can improve, thus making it possible to construct the optical transmission line suitable for large-capacity optical communications using a high bit rate and a wavelength division multiplexing system.

From the foregoing explanations of the invention, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical fiber line provided between optical amplifiers adjacent to each other, comprising:

two or more positive dispersion optical fibers, having a positive chromatic dispersion in a signal wavelength band, selected from a positive dispersion optical fiber group whose cumulative dispersion conforms to a distribution with an average value of $D_A$ (>0) and a standard deviation of $\sigma_A$; and two or more negative dispersion optical fibers, having a negative chromatic dispersion in the signal wavelength band, selected from a negative dispersion optical fiber group whose cumulative dispersion conforms to a distribution with an average value of $D_B$ (<0) and a standard deviation of $\sigma_B$;

wherein absolute value of a sum of average values $D_A$ and $D_B$ is not greater than 20% of the average value $D_A$, whereas absolute value of a difference between standard deviations $\sigma_A$ and $\sigma_B$ is not greater than 20% of the standard deviation $\sigma_A$; and wherein said positive dispersion optical fibers and said negative dispersion optical fibers are alternately arranged and in direct contact with each other.

2. An optical fiber line according to claim 1, wherein each of said positive dispersion optical fibers has a chromatic dispersion of 2 ps/nm/km or greater, and wherein each of said negative dispersion optical fibers has a chromatic dispersion of −2 ps/nm/km or smaller.

3. An optical fiber line according to claim 1, wherein the average value of dispersion slope in said plurality of positive dispersion optical fibers and the average value of dispersion slope in said plurality of negative dispersion optical fibers have polarities different from each other.

4. An optical fiber line according to claim 1, wherein each of said positive dispersion optical fibers and negative dispersion optical fibers has an effective area exceeding 50 $\mu m^2$.

5. An optical fiber line according to claim 1, wherein the absolute value of dispersion slope in each of said positive dispersion optical fibers and the absolute value of dispersion slope in each of said negative dispersion optical fibers are each smaller than 0.03 ps/nm²/km.

6. An optical fiber line according to claim 1, wherein the ratio of the mode field diameter of any of said negative dispersion optical fibers to the mode field diameter of any of said positive dispersion optical fibers is at least 0.8 but not exceeding 1.2.

7. An optical fiber line according to claim 1, wherein each of said positive dispersion optical fibers and negative dispersion optical fibers has a length of 5 km or shorter.

8. An optical transmission line containing a plurality of optical fiber lines according to claim 1, said optical transmission line comprising a plurality of optical cables arranged adjacent each other in a longitudinal direction; each said optical cable containing a plurality of positive dispersion optical fibers, having a positive chromatic dispersion in a signal wavelength band, selected from a positive dispersion optical fiber group whose cumulative dispersion conforms to a distribution with an average value of $D_A$ (>0) and a standard deviation of $\sigma_A$ and a plurality of negative dispersion optical fibers, having a negative chromatic dispersion in the signal wavelength band, selected from a negative dispersion optical fiber group whose cumulative dispersion conforms to a distribution with an average value of $D_B$ (<0) and a standard deviation of $\sigma_B$;

wherein, in first and second optical cables adjacent each other selected from said optical cables, said positive dispersion optical fibers contained in said first optical cable and said negative dispersion optical fibers contained in said second optical cable are coupled to each other, whereas said negative dispersion optical fibers contained in said first optical cable and said positive dispersion optical fibers contained in said second optical cable are coupled to each other.

9. An optical transmission line containing a plurality of optical fiber lines according to claim 1, said optical transmission line comprising a positive dispersion optical cable and a negative dispersion optical cable which are alternately arranged adjacent each other in a longitudinal direction; said positive dispersion optical cable containing a plurality of positive dispersion optical fibers, having a positive chromatic dispersion in a signal wavelength band, selected from a positive dispersion optical fiber group whose cumulative dispersion conforms to a distribution with an average value of $D_A$ (>0) and a standard deviation of $\sigma_A$; said negative dispersion optical cable containing a plurality of negative dispersion optical fibers, having a negative chromatic dispersion in the signal wavelength band, selected from a negative dispersion optical fiber group whose cumulative dispersion conforms to a distribution with an average value of $D_B$ (<0) and a standard deviation of $\sigma_B$;

wherein said positive dispersion optical fibers contained in said positive dispersion optical cable and said negative dispersion optical fibers contained in said negative dispersion optical cable are coupled to each other.

10. A method of making an optical cable in which the optical cables provided in the optical transmission line according to claim 8 are made, said method comprising the steps of:

selecting a plurality of positive dispersion optical fibers having a positive chromatic dispersion in a signal wavelength band from a positive dispersion optical fiber group whose cumulative dispersion conforms to a distribution with an average value of $D_A$ (>0) and a standard deviation of $\sigma_A$;

selecting a plurality of negative dispersion optical fibers having a negative chromatic dispersion in the signal wavelength band from a negative dispersion optical fiber group whose cumulative dispersion conforms to a distribution with an average value of $D_B$ (<0) and a standard deviation of $\sigma_B$; and using said plurality of positive dispersion optical fibers and said plurality of negative dispersion optical fibers so as to make a plurality of optical cables each containing positive and negative dispersion optical fibers.

11. A method of making an optical cable in which the positive dispersion optical cable and negative dispersion optical cable provided in the optical transmission line according to claim 9 are made, said method comprising the steps of:

selecting a plurality of positive dispersion optical fibers having a positive chromatic dispersion in a signal wavelength band from a positive dispersion optical fiber group whose cumulative dispersion conforms to a distribution with an average value of $D_A$ (>0) and a standard deviation of $\sigma_A$;

selecting a plurality of negative dispersion optical fibers having a negative chromatic dispersion in the signal wavelength band from a negative dispersion optical fiber group whose cumulative dispersion conforms to a distribution with an average value of $D_B$ (<0) and a standard deviation of $\sigma_B$; and using said positive dispersion optical fiber so as to make a positive dispersion optical cable, and using said negative dispersion optical fiber so as to make a negative dispersion optical cable.

12. A method of laying the optical transmission line according to claim 8, said method comprising the steps of:

preparing a plurality of optical cables; each said optical cable containing a plurality of positive dispersion optical fibers, having a positive chromatic dispersion in a signal wavelength band, selected from a positive dispersion optical fiber group whose cumulative dispersion conforms to a distribution with an average value of $D_A$ (>0) and a standard deviation of $\sigma_A$ and a plurality of negative dispersion optical fibers, having a negative chromatic dispersion in the signal wavelength band, selected from a negative dispersion optical fiber group whose cumulative dispersion conforms to a distribution with an average value of $D_B$ (<0) and a standard deviation of $\sigma_B$; and arranging said optical cables adjacent each other in a longitudinal direction:

such that, in first and second optical cables adjacent each other in said optical cables, said positive dispersion optical fibers contained in said first optical cable and said negative dispersion optical fibers contained in said second optical cable are coupled to each other, whereas said negative dispersion optical fibers contained in said first optical cable and said positive dispersion optical fibers contained in said second optical cable are coupled to each other.

13. A method of laying the optical transmission line according to claim 9, said method comprising the steps of:

preparing a positive dispersion optical cable containing a plurality of positive dispersion optical fibers, having a positive chromatic dispersion in a signal wavelength band, selected from a positive dispersion optical fiber group whose cumulative dispersion conforms to a distribution with an average value of $D_A$ (>0) and a standard deviation of $\sigma_A$;

preparing a negative dispersion optical cable containing a plurality of negative dispersion optical fibers, having a negative chromatic dispersion in the signal wavelength band, selected from a negative dispersion optical fiber group whose cumulative dispersion conforms to a distribution with an average value of $D_B$ (<0) and a standard deviation of $\sigma_B$; and alternately arranging said positive and negative dispersion optical cables in a longitudinal direction such that said positive dispersion optical fibers contained in said positive dispersion optical cable and said negative dispersion optical fibers contained in said negative dispersion optical cable are coupled to each other.

14. An optical fiber line according to claim 1, wherein the average value $D_A$ is within the range of 5 to 50 ps/nm, the standard deviation $\sigma_A$ is within the range of 0 to 5 ps/nm, the average value $D_B$ is within the range of −50 to −5 ps/nm, and the standard deviation $\sigma_B$ is within the range of 0 to 5 ps/nm.

* * * * *